Dec. 22, 1931.   G. F. MOX   1,837,573
BRAKE
Filed April 9, 1923
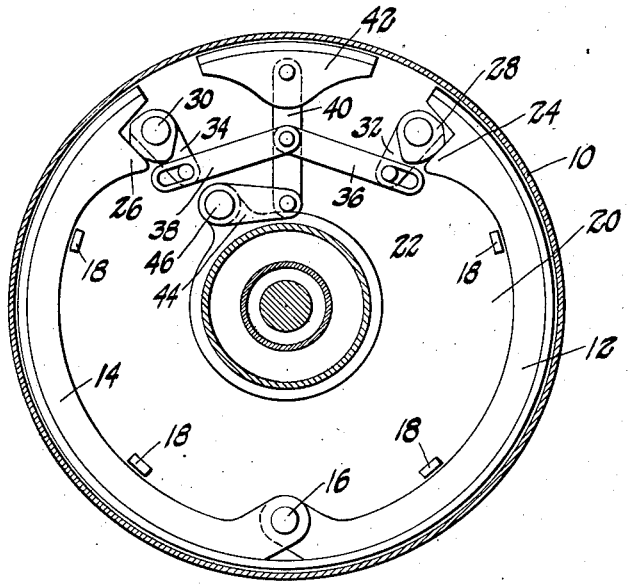
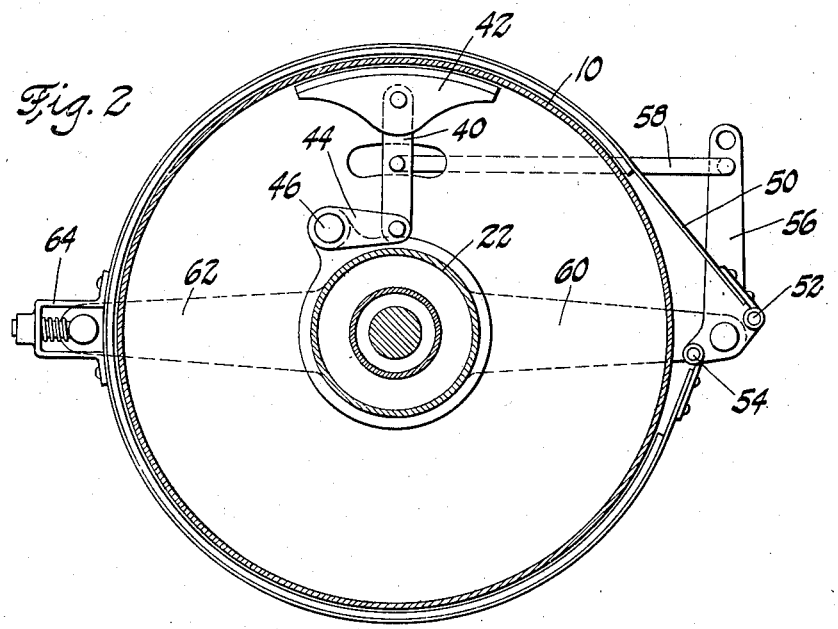
Witnesses
Wm. F. Pasco
Geo. E. Pasco
Inventor
George F. Mox
By his Attorney
Francis D. Hardesty Patented Dec. 22, 1931

1,837,573

UNITED STATES PATENT OFFICE

GEORGE F. MOX, OF DAYTON, OHIO, ASSIGNOR, BY MESNE ASSIGNMENTS, TO BENDIX BRAKE COMPANY, OF CHICAGO, ILLINOIS, A CORPORATION OF ILLINOIS

BRAKE

Application filed April 9, 1923. Serial No. 630,681.

This invention relates to "booster" brakes and is illustrated as embodied in external and internal band brakes for the rear wheels of an automobile.

An important object of the invention is to prevent the booster member of a brake of this type from becoming locked to the drum by what is known as a "grabbing" action, by arranging it so that it tends to leave the drum as it turns. This tendency is preferably very slight, and is readily counteracted by continued pressure on the brake pedal or equivalent controlling member, but is sufficient to prevent any possibility of such a "grabbing" action which might in an emergency cause a very serious accident.

Having this object in view, the invention contemplates the use of a booster member which is movable into frictional engagement with the brake drum, and which in a preferred form is eccentrically mounted with respect to the drum so that it turns on a radius which is shorter than the radius of the drum. In one arrangement, the booster member is arranged inside of the drum and is moved radially thereof under the control of the driver, and connections are provided therefrom to operate an expansible and contractable band having a retarding frictional engagement with the same drum. In one of the embodiments illustrated in the accompanying drawings, the booster member has lost motion connections with oppositely arranged band-operating devices such as cams, so that it operates one of these devices when the drum is turning in a clockwise direction and the other device when the drum is turning in a counterclockwise direction. The idle cam or other device serves as an anchor for the brake band. As a convenient construction which can be manufactured and assembled quickly and at minimum expense, the cams are operated by rock arms which are connected to the booster member by oppositely-extending slotted links. In the other illustrated embodiment, an external contracting band is operated by a rock arm connected to the booster member to be operated by its angular movement.

Another important feature of the invention, and whether or not the brake operates exactly as described above, resides in the provision of brake friction means so arranged that it never leaves the idle cam or anchorage during the application of the brake and therefore there is no disagreeable shock or click produced by the shifting of the anchorage after the brake is applied.

One phase of the invention which is important in connection with the increasing power of the brake relates to the use of a booster or servo shoe to apply a floating friction device of the type which shifts its anchorage so that it is fully effective in either direction of rotation of the drum.

The above and other objects and features of the invention, including various novel combinations of parts and desirable particular constructions, will be apparent from the following description of the described illustrative embodiments shown in the accompanying drawings, in which:

Figure 1 is a view in vertical section through the brake showing the operating parts in side elevation; and Figure 2 is a similar view of a modified form of brake.

In the modification shown in Figure 1 the drum 10 is engaged by retarding means shown as comprising a pair of shoes 12 and 14 pivotally connected to one another at 16 and capable of a limited circumferential movement. The idle position of the shoes is determined by suitable stops 18 fixedly secured to a central supporting plate 20 carried by a part 22 of the rear axle housing. A suitable spring 13 is tensioned between the shoes 12 and 14 in the customary manner to urge the shoes away from the drum and toward their released positions. Opposite ends of the shoes are cut away to provide shoulders 24 and 26 engaged by a pair of cams 28 and 30 pivotally secured to the plate 20 and having operating arms 32 and 34. Each of these arms has a pin extending through a slot in one of two links 36, 38 which are pivotally connected at their opposite ends to a link 40 connected to a radially movable booster shoe 42. The link 40 is operated, to move the shoe 42 radially, by an arm 44 fixedly secured to the brake operating rock shaft 46.

In the operation of this modification of the brake, depression of the pedal, or movement of an equivalent controlling member, serves to rock the shaft 46 which moves the shoe 42 radially into engagement with the inside surface of the drum 10. Assuming that this drum is turning, by reason of its being secured to one of the road wheels, this will cause angular movement of the shoe 42 about an axis passing through the point of pivotal connection between the link 40 and the arm 44. This angular movement operates one of the two links 36 or 38 to rock its cam, the other cam remaining idle as an abutment to prevent circumferential movement of its end of its brake shoe, this being permitted by the slotted connection with the idle arm 34 or 32 as the case may be. The friction device consisting of the shoes 12 and 14 in Fig. 1 shifts its anchorage from one end to the other depending upon the direction of rotation of the brake drum but the anchored end resting upon the idle cam never leaves the cam and as a consequence there is no disagreeable noise produced by the engagement of the friction device with its anchorage during the application of the brake. Furthermore, the friction device is fully effective throughout its entire length in either direction of rotation of the drum.

It is especially to be noted that the shoe 42 thus moves in an arc whose radius is substantially shorter than the radius of the drum 10 so that there is a tendency for the booster shoe to release its frictional hold on the drum as it turns. This releasing arrangement, which constitutes an important feature of novelty of my invention, makes it utterly impossible that the booster shoe should "grab" the drum,—that is to say, become locked thereto.

In the form shown in Figure 2, the drum 10 is encircled by an external brake band 50, the opposite ends of which are connected at 52 and 54 to a lever 56 connected by a link 58 with link 40 which operates the booster shoe 42 as described above. Lever 56 is pivotally mounted on an arm 60 connected to the axle housing 22, which also has an arm 62 carrying the yielding anchorage 64 for the central portion of the brake band, as is usual with this type of external brake.

In the operation of this form of brake, movement of the booster shoe 42 rocks the lever 56 to contract the band 50. The action of the brake may be adjusted by providing several holes in the upper end of the lever 56 to receive the hooked end of the link 58. It is to be noted that, unlike the modification shown in Figure 1, the brake shown in Figure 2 is only operative when the drum 10 is moving in a clockwise direction.

While two particular embodiments of my invention have been illustrated and described, it is not my intention to limit its scope to these embodiments or otherwise than by the terms of the appended claims. The term "drum", as used in the specification and claims, is not intended as a limitation to any particular form of retarded member, but as a convenient designation indicating broadly any movable member which is to be braked or retarded.

I claim:

1. A booster brake comprising, in combination, retarding means, a brake drum, a booster member pivotally mounted for angular movement on a radius which is shorter than the radius of the drum, driver-controlled connections for moving said member radially against the drum, and a pair of oppositely arranged lost motion devices one of which operates said retarding means when the drum is turning clockwise and the other of which operates the retarding means when the drum is turning counterclockwise.

2. A booster brake comprising, in combination, a brake drum, an expansible and contractable friction device associated with the drum and having a limited circumferential movement, a driver-controlled friction member movable into frictional engagement with the drum, and an operating device at each end of the friction device connected to the friction member in such a manner that one of said operating devices operates the friction device when the drum is turning clockwise and the other operates the friction device when the drum is turning counterclockwise.

3. A booster brake comprising, in combination, a drum, an expansible band within the drum, a cam at each end of the band, a driver-controlled booster member between the ends of the band arranged to be moved into engagement with the drum, and connections from the booster member to operate one of said cams.

4. A booster brake comprising, in combination, a brake drum, an expansible band within the drum, a cam at each end of the band, a booster member movable into engagement with the drum, and connections from the booster member for operating the cam on the side toward which the drum is turning.

5. A booster brake comprising, in combination, a brake drum, an expansible band within the drum, an operating cam at each end of the band, an arm for rocking each cam, a booster member movable into engagement with the drum, and slotted links connecting the booster member with said arms.

6. A booster brake comprising, in combination, a brake drum, a brake band extending part way around the drum, an operating cam at each end of the band, an arm for rocking each cam, a booster member between the ends of the band which is radially movable into frictional engagement with the drum, and oppositely extending slotted links connecting the booster member to said arms.

7. A brake comprising, in combination, a drum having a substantially cylindrical flange, a pair of pivotally connected shoes movable into frictional engagement with the inner surface of the flange, and extending around the drum in such a manner as to leave an unobstructed space between their free ends, a booster member in said space arranged to have a limited circumferential movement with the drum, manually-controlled means for moving the booster member against the flange of the drum, and means operated by circumferential movement of the booster member to swing the shoes into frictional engagement with the drum.

8. A brake comprising, in combination, a drum, a floating friction device engageable with the drum and anchoring at one end when the drum is turning in one direction and at the other end when the drum is turning in the other direction, a floating servo member engageable with the drum in such a manner that it tends to leave the drum as it moves angularly therewith, and means operated by movement of the servo member for forcing the friction device against the drum regardless of the end that is anchored.

9. A brake comprising, in combination, a drum, a floating friction device engageable with the drum and anchoring at one end when the drum is turning in one direction and at the other end when the drum is turning in the other direction, a floating servo member engageable with the drum and driver controlled connections for moving the servo member into engagement with the drum and causing the same to move in an arc having a shorter radius than the radius of the drum as the servo member moves angularly with the drum so that it cannot become locked therewith, and means operated by movement of the servo member in either direction by rotation of the drum for forcing the friction device against the drum regardless of the end that is anchored.

10. A brake comprising, in combination, a drum, a floating friction device engageable with the drum and anchoring at one end when the drum is turning in one direction and at the other end when the drum is turning in the other direction, a floating servo member engageable with the same part of the drum surface and angularly movable therewith on a radius which is shorter than the radius of the drum, and means operated by movement of the servo member for forcing the friction device against the drum.

11. A brake comprising, in combination, a drum, a floating friction device engageable with the drum and anchoring at one end when the drum is turning in one direction and at the other end when the drum is turning in the other direction, a floating servo member between said ends of the friction device, said servo member pivotally supported to have a tendency to move away from the drum as it moves angularly therewith and connections from the servo member for forcing the friction device against the drum.

12. A brake comprising, in combination, a drum, a floating friction device within the drum and anchoring at one end when the drum is turning in one direction and at the other end when the drum is turning in the other direction, a floating servo member within the drum between said ends of the friction device, and connections from the servo member for expanding the friction device against the drum.

13. A brake comprising, in combination, a drum, a floating friction device having one anchor when the drum is turning in one direction and a different anchor when the drum is turning in the other direction, and a servo shoe movable with the drum in either direction and forcing the friction device against the drum, the friction device being shiftable in whichever direction the servo shoe moves to transmit the braking torque to one or the other of the anchors, said servo shoe pivotally supported to have a tendency to move inwardly away from the drum as it moves angularly therewith.

14. A brake comprising a plurality of floating shoes, in combination with a servo shoe movable in either direction to apply the brake, and means for taking the braking torque from whichever one of the plurality of shoes the servo shoe moves away from, in either direction of movement of the servo shoe.

15. The combination with a stationary part and a rotatable member having a drum thereon with a cylindrical surface, of a non-continuous friction member floating within said cylindrical surface and normally positioned away from the same, a stop member, a second floating friction member positioned between the free ends of the first-mentioned friction member, and means for causing second friction member to engage said cylindrical surface, said engagement causing said second friction member to move in the direction of rotation of said cylindrical surface, thereby expanding said first friction member and causing the same to engage said cylindrical surface of said drum.

16. The combination with a rotatable part and a stationary member, of a drum having a cylindrical surface secured to said rotatable part, a friction member having free ends positioned within said drum and normally spaced from the said cylindrical surface, a stop member positioned between the free ends of said friction member, a second friction member between the free ends of the first-mentioned friction member normally positioned out of engagement with said cylindrical surface, said second friction member being capable of limited movement in the direction of the circumference of said cylindrical surface, and means for moving said second friction member into or out of engagement with said cylindrical surface.

17. A brake comprising, in combination, a drum, a friction device engageable with the drum, a cam operatively engaging each end of the friction device, and means for operating the cams including a friction member engageable with the drum in a manner to derive brake-applying power therefrom.

18. A brake comprising, in combination, a drum, a friction device engageable with the drum, an applying device operatively engaging each end of the friction device, and means for operating the two applying devices including a friction member engageable with the drum in a manner to derive brake-applying power therefrom.

19. A brake comprising, in combination, a drum, two friction devices engageable with the drum, a brake-applying arm (44), a link (40) connecting said arm and one friction device, and means operated by the swinging of the link by said device for applying the other friction device.

20. A brake comprising, in combination, a drum, a shoe engageable with the drum, a member pivotally connected to the shoe and swung by the shoe about an axis between the drum and the axis of the drum, a friction member engageable with the drum, and a device operating the friction member and connected to said pivotally connected member between its ends.

21. A brake comprising, in combination, a drum, a pair of friction devices engageable with the drum, a cam engaging the end of one of said devices, an arm for rocking the cam, an angularly movable member pivoted to the other friction device, and a link engaging said arm and operated by angular movement of said member.

22. A brake comprising, in combination, a rotatable member, friction means engageable with said member and having an effective anchorage adjacent to one end when the member is turning in one direction and having an effective anchorage adjacent to the other end when the member is turning in the opposite direction, said friction means including a part operated by engagement with the rotatable member for insuring against movement of the friction means away from its effective anchorage in the application of the brake.

23. The combination with a rotatable part and a stationary member, of a drum member having a cylindrical surface thereon, a non-continuous band within and normally spaced from said cylindrical surface, a shoe pivoted within said drum member situated between the free ends of said band and normally spaced from said cylindrical surface, a stop member positioned between the free ends of said band and secured to said stationary part, and means for moving said shoe into and out of engagement with said cylindrical surface.

24. The combination with a stationary part and a rotatable member, of a drum thereon with a cylindrical surface thereon, a non-continuous friction member floating within said cylindrical surface and normally spaced therefrom, a stop member between the free ends of said friction member, a second floating friction member positioned between the free ends of the first mentioned friction member, and means for causing second friction member to engage said cylindrical surface, said engagement causing said second friction member to move in the direction of rotation of said cylindrical surface, thereby expanding said first friction member to engage said cylindrical surface of said drum.

25. The combination with a rotatable part and a stationary member, of a drum having a cylindrical surface secured to said rotatable part, a friction member having free ends positioned within said drum and normally spaced from said cylindrical surface, a stop member positioned between the free ends of said friction member, a second friction member between the free ends of the first mentioned friction member normally positioned out of engagement with said cylindrical surface, capable of limited movement in the direction of the circumference of said cylindrical surface, and means for moving said second friction member into or out of engagement with said cylindrical surface to thereby expand said first friction member into engagement with said cylindrical surface.

26. A brake mechanism comprising, in combination, a drum, retarding means operatively engageable with said drum, a movable member arranged to engage said drum and connected to operate said retarding means by movement caused by its engagement with the drum, and means for moving said member into engagement with the drum, said movable member tending to leave the drum as it moves angularly therewith so that it cannot become locked thereto.

27. A brake mechanism comprising, in combination, retarding means, a drum, a shoe movable into frictional engagement with said drum, connections operated by angular movement of the shoe to operate said retarding means and driver-controlled connections for moving the shoe into engagement with said drum and causing said shoe to tend to move in an arc having a smaller radius than the radius of said drum so that said shoe cannot become locked to said drum.

28. A brake mechanism comprising, in combination, a retarding means, a brake drum, and an eccentrically mounted driver-controlled member angularly movable in either a clockwise or counter-clockwise direction by frictional engagement with the drum to operate said retarding means.

29. A brake mechanism comprising, in combination, retarding means, a brake drum, an angularly movable member mounted eccentrically with respect to said drum, and driver-controlled connections for moving said member radially of the drum into frictional engagement therewith to operate said retarding means.

In testimony whereof I hereto affix my signature.

GEORGE F. MOX.